UNITED STATES PATENT OFFICE.

FREDERICK A. GENTH AND GEORGE F. BARKER, OF PHILADELPHIA, PA., ASSIGNORS OF ONE-HALF THEIR RIGHT TO THOMAS R. BROWN AND HENRY BOWER, OF SAME PLACE.

IMPROVEMENT IN PROCESSES FOR PREVENTING THE FOULING OF GAS-LIME.

Specification forming part of Letters Patent No. 194,299, dated August 21, 1877; application filed May 1, 1877.

*To all whom it may concern:*

Be it known that we, FREDERICK A. GENTH and GEORGE F. BARKER, both of the city and county of Philadelphia, in the State of Pennsylvania, have invented a certain new and useful Process for Preventing the Fouling of Gas-Lime, of which the following is a specification:

The object of our invention is to enable the dry-lime purification of illuminating-gas to be conducted without the production of offensive odors in the spent lime, and thereby to obviate the damage and injury to neighboring property heretofore experienced in the practice of such purification in gas-works, with the further beneficial results of freeing the gas from disagreeable odor, and effecting an economy in the consumption of lime.

To these ends our improvement consists in passing the gas, after it leaves the hydraulic main or condenser, through a special purifier or purifiers containing sulphuric acid, or any suitable material charged therewith, so as to deprive it of ammonia and compounds of ammonium, and other similar bodies, before its admission to the ordinary lime-purifier, in which it is freed from sulphur and carbonic acid, so that the lime therein shall not, on being spent or "fouled," and exposed to the atmosphere, possess or produce an unpleasant or offensive odor.

It is a well-known fact that a serious and heretofore, in some instances, an insuperable, objection to the employment of the dry-lime purification in the manufacture of illuminating-gas has existed in the fact that, upon the exposure of the spent and fouled lime to the atmosphere, extremely offensive odors are evolved therefrom by reason of the chemical reactions which result in the volatilization of ammonia and ammonium compounds, &c., which it has taken up from the gas in the purification thereof.

The evolution of these odors constitutes a nuisance of an aggravated character in towns or cities, and necessitates the establishment of works in localities comparatively remote from those to which the gas is to be supplied, or in lieu thereof the employment of other and inferior methods of purification, or of expensive apparatus in the form of washers or scrubbers for the removal of the ammonia, the use of which is attended with a loss of illuminating power in the gas, while the ammonia is only partially removed, leaving a residue, which imparts an odor to the gas, and diminishes its illuminating capacity.

Processes for the deodorization of the fouled lime have, further, been proposed and practiced with a greater or less degree of success, but are undesirable, in view of entailing an increased expense for the removal instead of the prevention of the existing evil.

Our improvement is designed to absolutely avoid the production of foul odors in the lime used in the purification process, by the prevention of access thereto of ammonia, ammonium compounds, and other similar bodies, thereby enabling it the better to exert its purifying action, effecting an economy in the quantity of lime required for a given amount of gas, and giving, as a resultant, lime which, when spent, not only possesses no offensive odor, but, as we have found in practice, has a slight odor of an aromatic character, due to the presence of coal-tar compounds, such as naphthaline and the like.

To carry out our invention, we provide a special purifier or purifiers, to which the gas is conducted after it has left the hydraulic main or the condenser, preferably being first passed through the latter. This purifier may be of any convenient construction, the ordinary form of lime-purifier having shelves or trays being as desirable as any, and is to be charged with hydrated sulphuric acid of specific gravity of, say, 50° to 55° Baumé. The acid may be used either alone, in shallow pans or trays, so disposed as to present as large an amount of surface as practicable to the incoming gas, or the trays may be filled with small pieces of coke, pumice-stone, or other suitable fibrous or porous materal, or with sawdust, such material being first thoroughly saturated with the acid, so as to serve as a convenient vehicle for its retention and presentation to the gas.

By the action of the sulphuric acid upon the gas, the ammonia and ammonium compounds and other similar similar bodies are thoroughly eliminated therefrom, and the gas thus purged is conducted to a purifier or purifiers containing dry lime, which removes its sulphur and carbonic acid in the manner as at present generally practiced.

The lime when spent and removed from the purifiers will be found to possess none of the offensive odor characteristic of the ordinary fouled gas-lime so called; but on the contrary, as before stated, a slight aromatic odor is imparted to it by the presence of coal-tar compounds.

The quantity of lime required we have found to be measurably reduced, say, in the proportion of twenty per cent., and the purified gas having no traces of ammonia is free from odor derived therefrom, and possesses higher illuminating power.

We are aware that the property possessed by sulphuric acid of eliminating ammonia from gases and vapors is known in the arts, and do not, therefore, broadly claim the use thereof as an element in the purification of illuminating-gas.

We do not claim the use of acid, salts of the alkalies, nor such salts surcharged with acid, as these are not our invention; but

We claim as our invention and desire to secure by Letters Patent—

The process of preventing the fouling of gas-lime, or the imparting thereto of an offensive odor in purifying gas, which consists in passing the gas through sulphuric acid, or a suitable porous material charged therewith, to deprive it of ammonia, &c., before passing the gas through the lime, substantially as described.

F. A. GENTH.
GEORGE F. BARKER.

Witnesses:
J. SNOWDEN BELL,
F. A. GENTH, Jr.